(12) United States Patent
Wong et al.

(10) Patent No.: US 8,178,070 B2
(45) Date of Patent: May 15, 2012

(54) AIR DEMAND FEEDBACK CONTROL SYSTEMS AND METHODS FOR SULFUR RECOVERY UNITS

(75) Inventors: Vincent Wai Wong, Hacienda Heights, CA (US); Thomas King Chow, Irvine, CA (US); John Gebur, El Monte, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 56 days.

(21) Appl. No.: 12/664,563

(22) PCT Filed: Jun. 19, 2008

(86) PCT No.: PCT/US2008/007725
§ 371 (c)(1),
(2), (4) Date: Apr. 6, 2010

(87) PCT Pub. No.: WO2006/005155
PCT Pub. Date: Jan. 19, 2006

(65) Prior Publication Data
US 2010/0198407 A1    Aug. 5, 2010

Related U.S. Application Data

(60) Provisional application No. 60/945,495, filed on Jun. 21, 2007.

(51) Int. Cl.
*C01B 17/04* (2006.01)
*G05D 7/00* (2006.01)

(52) U.S. Cl. .......... 423/574.1; 423/573.1; 422/110; 422/111; 422/112; 422/168; 422/182

(58) Field of Classification Search .......... 422/112, 422/110, 111, 168, 182; 423/574.1, 573.1
See application file for complete search history.

(56) References Cited

U.S. PATENT DOCUMENTS

| | | | |
|---|---|---|---|
| 3,026,184 A | 3/1962 | Karasek | |
| 3,822,341 A * | 7/1974 | Smith | 423/574.1 |
| 3,854,876 A | 12/1974 | Rankine et al. | |
| 28,864 A | 6/1976 | Guillaume Andral | |
| 4,100,266 A * | 7/1978 | Smith | 423/574.1 |
| 4,543,245 A | 9/1985 | Peterman et al. | |
| 4,822,591 A * | 4/1989 | Reed et al. | 423/574.1 |
| 4,836,999 A | 6/1989 | Reed et al. | |
| 4,908,201 A * | 3/1990 | Cabanaw | 423/574.1 |
| 4,988,494 A | 1/1991 | Lagas et al. | |
| 5,015,459 A * | 5/1991 | Pendergraft | 423/574.1 |
| 5,015,460 A * | 5/1991 | Pendergraft | 423/574.1 |
| 5,266,274 A * | 11/1993 | Taggart et al. | 422/112 |
| 6,113,872 A * | 9/2000 | Nougayrede | 423/242.1 |
| 6,287,535 B1 | 9/2001 | Schendel | |

FOREIGN PATENT DOCUMENTS
WO    2006/005155    1/2006
* cited by examiner

*Primary Examiner* — Walter D Griffin
*Assistant Examiner* — Huy-Tram Nguyen
(74) *Attorney, Agent, or Firm* — Fish & Associates, PC

(57) ABSTRACT

A Claus plant with multiple parallel thermal stages that provide a combined effluent to downstream catalytic stages includes a controller that allows independent and individual control for each of the thermal stages as a function of measured chemical composition of the thermal stage effluents and catalytic stage effluent.

13 Claims, 1 Drawing Sheet

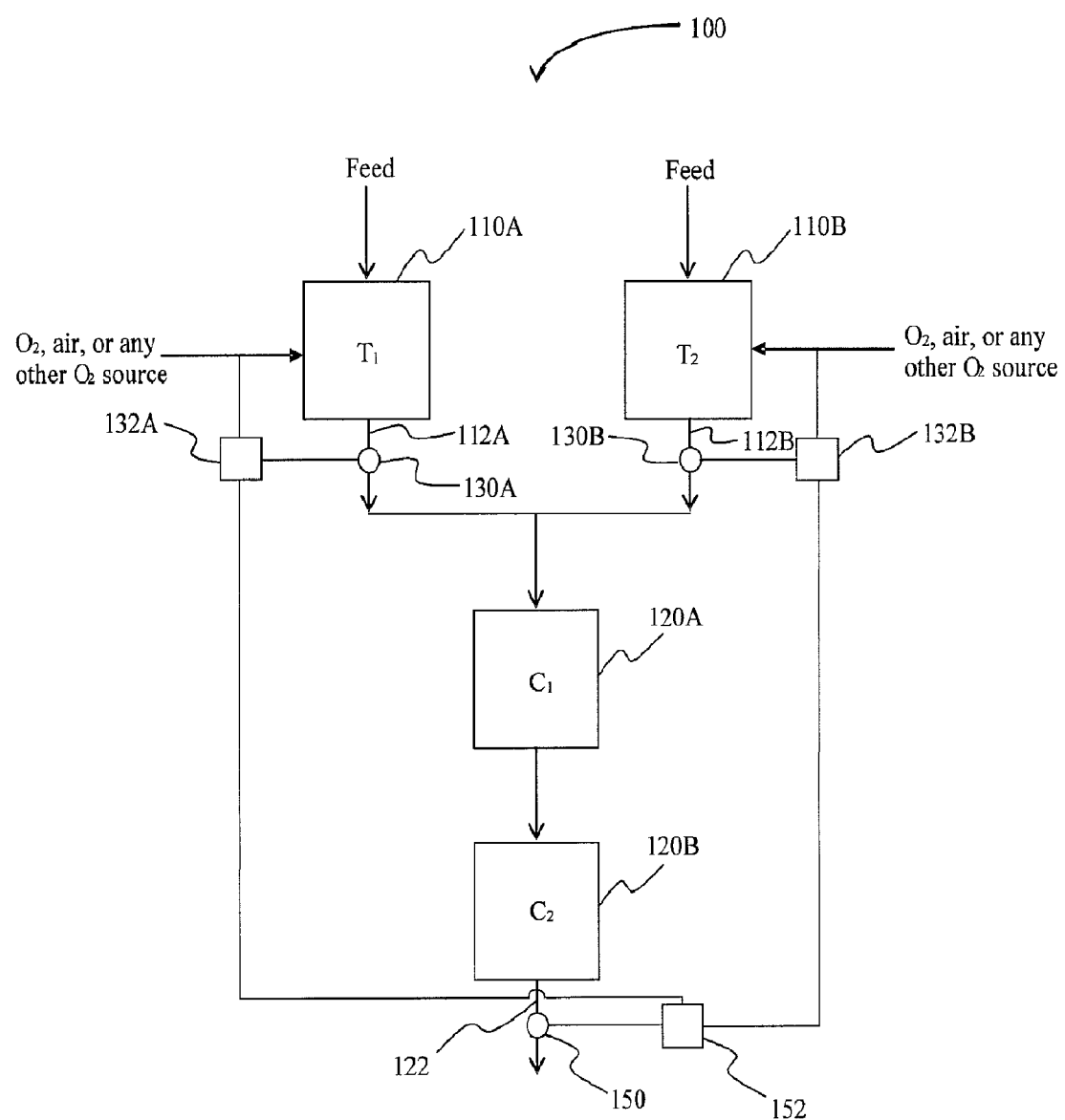

AIR DEMAND FEEDBACK CONTROL SYSTEMS AND METHODS FOR SULFUR RECOVERY UNITS

This application claims priority to our copending U.S. provisional patent application with the Ser. No. 60/945,495, which was filed Jun. 21, 2007.

FIELD OF THE INVENTION

The field of the invention is control systems for Claus plant sulfur recovery units, and especially control systems for Claus plants with multiple thermal stages.

BACKGROUND OF THE INVENTION

Sulfur compounds (and especially hydrogen sulfide) are typically removed from a waste gas prior to venting into the atmosphere using one or more Claus plant sulfur recovery units that include a thermal stage followed in series by one or more catalytic stages. While sulfur recovery using a Claus plant is conceptually simple and well known in the art, effective operation of a Claus plant is not trivial due to numerous variable parameters. Among other factors, the chemical composition (e.g., content and relative proportions of hydrogen sulfide, carbon dioxide, and water) of the feed stream into the Claus plant may change considerably dependent on the type of facility and processes used upstream of the Claus plant. Therefore, based on the specific stoichiometric requirements of the Claus reaction, stringent control of oxygen quantities for the thermal stage is critical for effective operation of a Claus plant.

In most currently known configurations with a single thermal stage, constant chemical composition of the waste gas feed is assumed for control of the amount of oxygen needed in the thermal stage. To accommodate small variations in hydrogen sulfide concentration in the feed gases, and to account for inaccuracies in the thermal stage control instrumentation, it is common practice to install feedback control instrumentation in such plants to make fine adjustments to the thermal stage air demand logic. The feedback logic in such systems typically involves gas analysis of the molar ratio of hydrogen sulfide to sulfur dioxide in the tail gas leaving the final catalytic stage. A control signal from a tail gas analyzer is then used to make small changes to the quantity of air or other oxygen-containing gas that is delivered to the thermal stage to achieve the desired ratio of hydrogen sulfide to sulfur dioxide in the effluent stream. A typical example for such configuration is described in U.S. Pat. No. 4,100,266 where flow of an oxygen-containing gas is regulated using a controller that operated on the basis of measured oxygen concentration in the oxygen-containing gas and measured concentration of various components in the tail gas and vented gas stream. Similarly, RE028864 describes a system in which a control signal to regulate flow of oxygen or oxygen containing gas is generated from (a) measured concentrations of hydrogen sulfide and oxygen at the inlet of the thermal stage and a corrective value, and (b) measured concentrations of components in the tail gas.

In further known configurations (e.g., WO 2006/005155, or U.S. Pat. No. 3,026,184), process control is achieved using measurements downstream of both the thermal stage and the catalytic stage to form a combined control signal that is then used to directly regulate the flow of the oxygen-containing gas to the thermal stage. Combined control signals allow for increased fine-tuning of oxygen flow based on two process points, however, will typically not allow differentiation between imbalances at the two process points.

Alternatively, temperature control of the thermal stage may be employed to optimize the overall performance of a Claus plant as described in U.S. Pat. No. 4,543,245, and in yet another known approach, oxygen feed to the thermal stage can be controlled by calibrating a hydrocarbon-representative response signal (rather than a hydrogen sulfide representative response signal) that is responsive to the ratio of hydrogen sulfide/sulfur dioxide in the Claus plant tail gas as described in U.S. Pat. No. 4,836,999.

While such known tail gas control circuits tend to operate satisfactorily under many circumstances, various difficulties remain, especially in relatively large Claus plants that need to process very large quantities of sour feeds. Such plants often include several thermal stages operating in parallel followed by one or more catalytic stages operating in series. Unfortunately, such known configurations with parallel thermal stages present problems with feedback control from the tail gas analyzer (typically measuring ratio of hydrogen sulfide to sulfur dioxide). For example, the desired tail gas ratio may not be achieved where one of the thermal stages operates with too much air or oxygen while the other thermal stage(s) operate(s) with the correct amount or too little air. Since in such plants the tail gas analyzer is positioned downstream of the common catalytic stage, the downstream analyzer is insensitive to differences between the independently operating thermal stages. As such, the analyzer's feedback control signal will take the correct action for one of the thermal stages, but an incorrect action for the other(s), potentially intensifying the problem. Thus, control of the Claus plant may continually swing from tail gas hydrogen sulfide to sulfur dioxide ratios that are too high, to ratios that are too low.

To circumvent at least some of the problems associated with plants having multiple parallel thermal stages, a Claus plant configuration can be implemented in which oxygen flow control to the additional thermal stage is achieved by measuring the flow rate of combustible gas into the additional thermal stage and the ratio of hydrogen sulfide to sulfur dioxide in the sulfur depleted gas stream from the additional thermal stage as described in U.S. Pat. No. 6,287,535. While such configurations and methods advantageously allow for significantly increased throughput of combustible acid gas, several problems nevertheless remain. Once more, any deviation of a desired ratio between hydrogen sulfide to sulfur dioxide in the tail gas can not be traced back to a particular thermal stage that produced or precipitated the deviation.

Therefore, while numerous methods of operational control for Claus plants are known in the art, all or almost all of them suffer from one or more disadvantages. Thus, there is still a need to provide improved configurations and methods for control in Claus plants.

SUMMARY OF THE INVENTION

The present invention is directed to configurations and methods of control of a Claus plant having multiple parallel thermal stages in which measurement of effluent composition from the thermal stages and from the catalytic stage(s) is used to produce control signals that independently allow changing of one or more operational parameters of one or more thermal stages.

In one aspect of the inventive subject matter, a method of controlling operation of a Claus plant comprises a step of monitoring chemical composition of first and second thermal stage effluents, wherein the first and second thermal stages operate in parallel, and a further step of monitoring the chemical composition of a catalytic stage effluent where the catalytic stage is coupled to first and second thermal stage to receive the first and second thermal stage effluents. In yet another step, an operational parameter is independently adjusted in at least one of the first and second thermal stages based on results obtained from the measurements of the thermal and catalytic stage effluents.

Most preferably, the step of monitoring of the chemical composition of the thermal and/or catalytic stage effluent comprises measuring of hydrogen sulfide and/or sulfur dioxide concentrations, and most typically includes measuring of a ratio of hydrogen sulfide to sulfur dioxide. Based on the measured concentrations, it is generally preferred that a first and/or a second control signal are calculated, and that the first and/or second control signals are used to adjust one or more operational parameters of at least one of the first and second thermal stages. Additionally, it is contemplated that the temperature in at least one of the first and second thermal stages is measured. Consequently, suitable operational parameters include the flow rate of air, the flow rate of an oxygen-containing gas, the flow rate of sour gas into the first and/or second thermal stages, and/or the temperature in the first and/or second thermal stages.

Therefore, and viewed from a different perspective, a Claus plant control system has a first effluent analyzer that is operationally coupled to a first thermal stage of a Claus plant, and a second effluent analyzer that is operationally coupled to a second thermal stage of the Claus plant, wherein first and second thermal stages are configured to operate in parallel. In such plants, a first controller is operationally coupled to the first thermal stage and configured to control a first operational parameter of the first thermal stage, and a second controller is operationally coupled to the second thermal stage and configured to control a second operational parameter of the second thermal stage. A third effluent analyzer is operationally coupled to a catalytic stage of a Claus plant, wherein the catalytic stage is configured to receive the combined effluent from the first and second thermal stage. A control unit is coupled to the first, second, and third effluent analyzers and programmed or otherwise configured to allow independent adjustment of the first and second operational parameters of the first and second controllers.

Most typically, the first, second, and/or third effluent analyzers are configured to measure a ratio of hydrogen sulfide to sulfur dioxide, and first and second temperature analyzers may be coupled to the first and second controllers. In especially contemplated plants, the control unit is programmed to provide first and second control signals to the first and second controllers, respectively, to thereby independently adjust set points for a ratio of hydrogen sulfide to sulfur dioxide for the first and second thermal stages. Alternatively, or additionally, the control unit may also be programmed to provide first and second control signals to the first and second controllers, respectively, to thereby independently adjust operating temperature of the first and second thermal stages. Where desirable, the control unit may be integrated with the first controller.

Various objects, features, aspects and advantages of the present invention will become more apparent from the following detailed description of preferred embodiments of the invention, along with the accompanying drawing.

BRIEF DESCRIPTION OF THE DRAWING

FIG. 1 is a schematic illustration of an exemplary Claus plant control configuration according to the inventive subject matter.

DETAILED DESCRIPTION

The inventors have discovered that control systems for a Claus plant having multiple parallel thermal stages upstream of a series of common catalytic stages can be implemented such that operation of each of the thermal stages can be individually controlled to provide a an effluent with a desired hydrogen sulfide to sulfur dioxide ratio. Therefore, in particularly contemplated configurations and methods, a gas analyzer is provided to the outlet of each thermal stage and configured to analyze the hydrogen sulfide to sulfur dioxide ratio in the gas stream exiting the respective stages. Based on a predetermined and desired ratio of hydrogen sulfide to sulfur dioxide in the common downstream catalytic stage tail gas, and based on the actual ratio of hydrogen sulfide to sulfur dioxide in the individual thermal stages of the Claus plant, a processing unit will calculate the required corresponding corrected ratios for each of the outlets of the upstream thermal stages. Thus, a calculated feedback control signal from the tail gas analyzer resets the hydrogen sulfide to sulfur dioxide ratio set-point at each of the thermal stages' gas analyzer controllers. Consequently, each gas analyzer controller of the respective thermal stage will be used to make the small additions or deletions to the quantity of air (or other oxygen-containing gas) that is delivered to that thermal stage in order to attain the desired ratio of hydrogen sulfide to sulfur dioxide in that stage's effluent stream.

In one exemplary aspect of the inventive subject matter as schematically illustrated in FIG. 1, a Claus plant 100 includes two thermal stages 110A and 110B operating in parallel, and two catalytic stages 120A and 120B that receive the combined effluents of the upstream thermal stages 110A and 110B and operate serially. Thermal stage effluents 112A and 112B are analyzed by respective sensors 130A and 130B and associated analyzers/controllers 132A and 132B. Most preferably, the analyzer signals from analyzers/controllers 132A and 132B are generated as a function of the signals from the corresponding sensors and transmitted to the analyzer/controller 152. Catalytic stage effluent 122 is analyzed by respective sensor 150 and corresponding analyzer/controller 152. The analyzer/controller 152 is then programmed to individually re-adjust the initial set-points of analyzers/controllers 132A and 132B based on the analyzer signals from analyzers/controllers 132A and 132B and the analyzer signals from analyzer/controller 152 to so individually and independently regulate the composition of effluents 112A and 112B and thus catalytic stage effluent 122. Therefore, it should appreciated that there may be unidirectional or bidirectional flow of information between the analyzer/controller 152 and analyzers/controllers 132.

In alternative aspects of the inventive subject matter it should be appreciated that the individual control of the various operational parameters may be implemented in manners other than those described above for FIG. 1. For example, it is contemplated that a separate control unit may receive signals from all sensors and/or analyzers, wherein the so transmitted signals correspond to the measured value of one or more operational parameters of the thermal stage(s) and/or catalytic stage. Such central control unit may then be used to control the operational parameters of all thermal and catalytic stages. On the other hand, and where desirable, it is contemplated that each of the analyzers/controllers may also include at least part of the control unit and so obviate a central control unit. Such analyzers/controllers will then be configured to allow coupling to at least two other analyzers/controllers to allow uni- and more preferably bidirectional communication with each other.

With respect to the type of sensors, and analyzers/controllers, it should be appreciated that all known sensors and analyzers/controllers are deemed suitable for use herein. However, it is especially preferred that the sensors provide real-time or near real-time (e.g., lag time less than 10 minutes, more preferably less than 5 minutes) compositional information for at least one component in the effluent. Most typically, the sensor therefore comprises an optical component (e.g., spectroscopic sensor) and in less preferred aspects (e.g., where fluctuations are relatively slow) a chromatographic component. It should still further be appreciated that the sensor may be suitable to measure a single component (e.g., hydrogen sulfide) or multiple components (e.g., hydrogen sulfide and sulfur dioxide), or surrogate markers thereof. On the other hand, multiple sensors are also contemplated that may be used to measure multiple components.

It is generally preferred that the sensor for the thermal stage is positioned upstream of the entry point of the combined effluents to the catalytic stage. For example, where the thermal stage has a downstream sulfur condenser, it is contemplated that the sensor is positioned at or near the condenser outlet. On the other hand, where no sulfur condenser is present, the sensor is typically positioned in close proximity of the thermal stage outlet. In still further contemplated aspects of the inventive subject matter, it is contemplated that an additional sensor may be positioned such that the additional sensor senses the concentration of at least one component in a combined thermal stage effluent stream, which may be especially advantageous where three or more thermal stage effluents are combined. The additional sensor may then be coupled to the control unit to provide further information on potential stoichiometric imbalances. Similarly, it is contemplated that multiple sensors in a train of catalytic stages may be provided where two, three, or even more catalytic stages are employed.

With respect to suitable analyzers and/or controllers it is contemplated that all known analyzers and process controllers for adjusting air and/or oxygen feed, sour gas feed, and/or temperature in the thermal stage are suitable for use herein. Therefore, such analyzers and/or controllers may be integrated into a single device or be provided as separate components. As pointed out above, the controller may also include at least part of the control unit that modifies the controller of the thermal stage.

Consequently, it should be appreciated that precise control of the quantity of air or other oxygen-containing gas delivered to the thermal stage can now be achieved, which is critical to proper operation of a Claus plant. In contrast, currently known tail gas feedback control strategies cannot achieve such regulation where the catalytic stage is preceded by multiple parallel thermal stages.

Thus, specific embodiments and applications of control systems for sulfur recovery units have been disclosed. It should be apparent, however, to those skilled in the art that many more modifications besides those already described are possible without departing from the inventive concepts herein. The inventive subject matter, therefore, is not to be restricted except in the spirit of the present disclosure. Moreover, in interpreting the specification and contemplated claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of controlling operation of a Claus plant, comprising the steps of:
    (a) individually monitoring chemical composition of first and second thermal stage effluents, wherein the first and second thermal stages operate in parallel;
    (b) monitoring chemical composition of a catalytic stage effluent that is coupled to first and second thermal stage to receive the first and second thermal stage effluents; and
    (c) independently adjusting an operational parameter in at least one of the first and second thermal stages based on results obtained from steps (a) and (b).

2. The method of claim 1 wherein the step of monitoring the chemical composition in at least one of the steps (a) and (b) comprises measuring a concentration of at least one of hydrogen sulfide and sulfur dioxide.

3. The method of claim 1 wherein the step of monitoring the chemical composition in steps (a) and (b) comprises measuring of a ratio of hydrogen sulfide to sulfur dioxide.

4. The method of claim 2 or claim 3 further comprising a step of calculating a first and a second control signal, and using at least one of the first and second control signals to respectively adjust the operational parameter in the at least one of the first and second thermal stages.

5. The method of claim 1 further comprising a step of monitoring temperature in at least one of the first and second thermal stages.

6. The method of claim 1 wherein the operational parameter is selected from the group consisting of a flow rate of air, a flow rate of an oxygen-containing gas, a flow rate of a sour gas into the at least one of the first and second thermal stages, and temperature in at least one of the first and second thermal stages.

7. A Claus plant control system that comprises:
    a first effluent analyzer operationally coupled to a first thermal stage of a Claus plant, and a second effluent analyzer operationally coupled to a second thermal stage of the Claus plant, wherein first and second thermal stages are configured to operate in parallel;
    a first controller operationally coupled to the first thermal stage, wherein the first controller is configured to control a first operational parameter of the first thermal stage;
    a second controller operationally coupled to the second thermal stage, wherein the second controller is configured to control a second operational parameter of the second thermal stage;
    a third effluent analyzer operationally coupled to a catalytic stage of a Claus plant, wherein the catalytic stage of the Claus plant is configured to receive combined effluent from the first and second thermal stage; and
    a control unit that is coupled to the first, second, and third effluent analyzers and programmed to allow independent adjustment of the first and second operational parameters of the first and second controllers.

8. The control system of claim 7 wherein the first and second effluent analyzers are configured to measure a ratio of hydrogen sulfide to sulfur dioxide.

9. The control system of claim 7 wherein the third effluent analyzer is configured to measure a ratio of hydrogen sulfide to sulfur dioxide.

10. The control system of claim 7 further comprising first and second temperature analyzers coupled to the first and second controllers.

11. The control system of claim 7 wherein the control unit is programmed to provide first and second control signals to the first and second controllers, respectively, to thereby independently adjust set points for a ratio of hydrogen sulfide to sulfur dioxide for the first and second thermal stages.

12. The control system of claim 7 wherein the control unit is programmed to provide first and second control signals to the first and second controllers, respectively, to thereby independently adjust operating temperature of the first and second thermal stages.

13. The control system of claim 7 wherein the control unit is integrated with the first controller.

* * * * *